US006488754B2

(12) United States Patent
McPherson et al.

(10) Patent No.: US 6,488,754 B2
(45) Date of Patent: Dec. 3, 2002

(54) LITHOGRAPHIC DAMPENING SOLUTION AND METHOD FOR DAMPENING A LITHOGRAPHIC PLATE

(75) Inventors: Roger E. McPherson, Muscatine, IA (US); Leona E. Bishop, Muscatine, IA (US); Richard L. Antrim, Solon, IA (US)

(73) Assignee: Grain Processing Corporation, Muscatine, IA (US)

( * ) Notice: Subject to any disclaimer, the term of this patent is extended or adjusted under 35 U.S.C. 154(b) by 140 days.

(21) Appl. No.: 09/726,092

(22) Filed: Nov. 29, 2000

(65) Prior Publication Data

US 2002/0100383 A1 Aug. 1, 2002

(51) Int. Cl.$^{7}$ ............................ B41N 3/08; C09D 10/00

(52) U.S. Cl. ............................ 106/163.01; 106/204.01; 106/205.01; 106/205.9; 106/217.9; 101/450.1; 101/147

(58) Field of Search .............................. 101/450.1, 147; 106/168.01, 204.01, 205.01, 205.9, 217.9

(56) References Cited

U.S. PATENT DOCUMENTS

| | | | | |
|---|---|---|---|---|
| 2,801,955 A | | 8/1957 | Rutenberg et al. | |
| 2,868,778 A | | 1/1959 | Watson et al. | |
| 3,716,526 A | | 2/1973 | Schweiger | |
| 4,030,417 A | | 6/1977 | Lipovac | |
| 4,038,481 A | | 7/1977 | Antrim et al. | |
| 4,095,525 A | | 6/1978 | Tsukada et al. | |
| 4,150,996 A | | 4/1979 | Druker et al. | |
| 4,764,213 A | | 8/1988 | Gventer et al. | |
| 4,798,627 A | | 1/1989 | Schmitt et al. | |
| 5,256,190 A | | 10/1993 | Barth | |
| 5,279,648 A | | 1/1994 | Chase | |
| 5,382,298 A | | 1/1995 | Bondurant | |
| 5,615,613 A | | 4/1997 | Hattori et al. | |
| 6,063,178 A | * | 5/2000 | McPherson et al. | 106/163.01 |

FOREIGN PATENT DOCUMENTS

| | | |
|---|---|---|
| DE | 25 04 594 | 8/1975 |
| DE | 26 48 805 | 5/1977 |
| DE | 3536485 | 4/1987 |
| EP | 0 066 176 | 12/1982 |
| EP | 0 249 752 | 12/1987 |
| EP | 0 251 621 | 1/1988 |
| EP | 0 517 959 | 12/1992 |
| WO | 98/40413 | 9/1998 |

* cited by examiner

*Primary Examiner*—David Brunsman
(74) *Attorney, Agent, or Firm*—Leydig Voit & Mayer Ltd

(57) ABSTRACT

Disclosed are a lithographic dampening solution and a method for dampening a lithographic plate. The solution comprises an aqueous solution of a gum, which may be a corn-hull-derived hemicellulose or the enzyme digestion product of a hemicellulose. The method generally comprises dampening a lithographic plate with the disclosed dampening solution.

29 Claims, No Drawings

LITHOGRAPHIC DAMPENING SOLUTION AND METHOD FOR DAMPENING A LITHOGRAPHIC PLATE

TECHNICAL FIELD OF THE INVENTION

The invention is in the field of offset lithography, and more specifically relates to a lithographic dampening solution and a method for dampening a lithographic plate.

BACKGROUND OF THE INVENTION

Offset lithography is a printing process in which an image carrier takes the form of a plate which includes a photochemically produced ink-receptive image area and an ink-repellant non-image area. Inks used in traditional offset lithography processes are oil-based, and thus the image area on a printing plate typically is hydrophobic and the non-image area is hydrophilic. In an offset lithographic operation, the plate is mounted on a cylinder and is dampened with a dampening solution, which is typically an aqueous solution of chemicals, and which adheres to the non-image area of the plate. The plate is next contacted by inked rollers, which apply ink to the image area of the plate. The inked image is transferred to a rubber-like blanket, on which the image becomes reversed. The inked image on the blanket is then transferred to a printing substrate, typically a sheet of paper, thereby producing an impression of the inked image on the paper.

The dampening solution is used to cause a crisp division between the image and non-image areas of the printing plate, to thereby provide high resolution in the print. Conventional dampening solutions include water and a gum and, typically, an acid or a base, corrosion inhibitor, buffer, wetting agent, drying stimulator, fungicide, anti-foaming agent, and possibly other ingredients of a conventional nature. The gum is used in an amount effective to provide sufficient film formability to enhance the ink repellency of the non-image area of the lithographic plate.

Historically and conventionally, the gum used in dampening solutions is gum arabic, as disclosed, for instance, in U.S. Pat. Nos. 4,030,417; 4,150,996; 5,256,190; and 5,382,298; in EP 066176,249752; and 251,621; and in DE 3,536,485. Although dampening solutions made with gum arabic are satisfactory from a technical standpoint, there are a number of potential and actual problems in obtaining gum arabic. Gum arabic is the exudate of a woody plant (acacia) that is grown in areas of the world that presently are politically unstable, for example, the Sudan. For this reason, and because the supply of gum arabic is largely dependent upon unpredictable climactic conditions, the constancy of the supply of gum arabic is somewhat unstable. In addition, the quality of harvested gum arabic can be variable.

In recognition of these potential and actual problems, the prior art has provided dampening solutions that include a number of chemically synthesized substitutes for gum arabic. For instance, U.S. Pat. No. 5,279,648 discloses a dampening solution that includes hydroxypropyl cellulose. Another reference, DE 2,504,594, discloses a dampening solution that includes an acrylamide-acrylic acid copolymer. These dampening solutions are believed to be somewhat unsatisfactory. A dampening solution that includes a chemically derivatized dextran is taught in EP 517,959, and a dampening solution that includes a chemically derivatized pullulan is disclosed in DE 2,648,805. While these solutions are somewhat satisfactory, the need for derivatization adds cost to the formulation process for these solutions.

It is a general object of the invention to provide a dampening solution that is composed of water and a naturally occurring biopolymer. A related general object of the invention is to provide a method for dampening a lithographic plate.

THE INVENTION

It has now been found that aqueous solutions of hemicellulose, particularly corn-hull-derived hemicellulose, may be used to dampen lithographic plates. Hemicellulose is a naturally occurring component of seed hulls, such as corn seed hulls, and is obtained from the hulls during industrial processing. It has further been found that the enzyme digestion product of hemicellulose, in particular, the xylanase digestion product, may be used in a dampening solution to dampen a lithographic plate. The commercial availability of hemicellulose is more steady and reliable than that of gum arabic, in that the corn crop in the United States is large and stable, and the hemicellulose content of corn seeds is uniform and predictable. For this reason, the use of hemicellulose as a dampening solution gum is advantageous. Moreover, although the use of soybean hemicellulose has been provided in the art (for instance in U.S. Pat. No. 5,615,613), the composition of soybean derived hemicellulose is substantially similar to that of gum arabic, while the composition of corn hull hemicellulose is markedly different. The ability of corn hull derived hemicellulose to function in a dampening solution in a manner as satisfactory as gum arabic is surprising, in light of the substantial differences in composition between corn hull derived hemicellulose and gum arabic.

In one embodiment, the invention generally provides a method for dampening a lithographic plate. The method generally comprises the step of applying a dampening solution to at least the non-image area of the lithographic plate. The dampening solution comprises an aqueous solution of a corn-hull-derived hemicellulose, which is present in the dampening solution in an amount effective to provide sufficient film formability to enhance the ink repellency of the non-image area of the plate. In another embodiment, the method includes the steps of applying a dampening solution that includes water and the enzyme digestion product of a hemicellulose, such as a corn hull derived hemicellulose, or alternatively a hemicellulose derived from another seed source. The invention further provides a dampening solution that includes the enzyme digestion product of a hemicellulose and a surfactant, the surfactant being present in an amount effective to enhance the wettability of the dampening solution.

Other features and embodiments of the invention are set forth in the following description of the preferred embodiment, and in the appended claims.

DESCRIPTION OF PREFERRED EMBODIMENT

The invention generally contemplates a dampening solution that includes hemicellulose, in particular, corn-hull-derived hemicellulose, or that includes the enzyme digestion product of hemicellulose. Hemicellulose is a water-soluble, highly branched polymer of xylose having side-chains composed of arabinose, galactose, and terminal glucuronic acid. The isolation of corn hull hemicellulose from corn hulls is taught in U.S. Pat. Nos. 2,801,955; 2,868,778; 3,716,526; and 4,038,481.

Once isolated, the hemicellulose may be used in an aqueous solution as a dampening solution, or the hemicellulose may be treated with an enzyme to thereby result in an enzyme digestion product that may be used in aqueous solution as a dampening solution. Most preferably, the enzyme is a xylanase enzyme. By "digestion" is contemplated the full or partial, most preferably, partial, digestion by the enzyme to yield a product that is fully or partially depolymerized by the enzyme, and in the case of partial digestion, possibly including some undigested hemicellulose. The hemicellulose used in conjunction with this embodiment of the invention preferably is corn-hull-derived hemicellulose, but alternatively may be a hemicellulose derived from another source, such as rice, wheat, or soybeans. While it is feasible to use hemicellulose without enzymatic digestion, such is less preferred inasmuch as the dampening solution generally will not be satisfactory for commercial purposes. In accordance with the invention, the enzyme digestion should be sufficient to enhance the ability of the hemicellulose to repel ink in the dampening solution. While it is not intended to limit the invention to a particular theory of operation, it is believed that the enzyme will reduce the average molecular size of the xylose polymers in hemicellulose to thereby cause the hemicellulose digestion product to interact more successfully with the surface of the lithographic printing plate to form a hydrophilic surface which repels hydrophobic lithographic ink.

After enzyme treatment, the digest product may be further treated with a bleach, which preferably is hydrogen peroxide. The hydrogen peroxide is believed to further reduce the molecular weight of the hemicellulose and to improve the color of the product. The bleach alternatively may comprise another oxidant, such as sodium hypochlorite. When the dampening solution includes undigested hemicellulose, such undigested hemicellulose similarly may be treated with bleach. Details concerning treatment of hemicellulose with hydrogen peroxide are taught in WO 98/40413.

In accordance with the invention, a dampening solution that generally includes water and one or more gums is provided. The gum may be corn-hull-derived hemicellulose, or the enzyme digestion product of a hemicellulose, alone or in combination with one or more additional gums. The additional gum may be a natural, semi-synthetic, or synthetic gum. Examples of conventional naturally occurring gums include gum arabic, tragacanth gum, carageenan, xanthan gum, gelatin, casein sodium, guar gum, gum tare, glue plants (funori), agar, furcellaran, tamarind seed polysaccharides, gumkaraya, hibiscus, pectin, sodium alginate, pullulan, gellan gum, locust bean gum, albumin, and various starches. Examples of semi-synthetic gums include carboxymethyl cellulose (CMC), methyl cellulose (MC), ethyl cellulose (EC), hydroxyethyl cellulose (HBC), alginic acid propylene glycol ester and chemically modified starches including soluble starches. Examples of conventional synthetic gums include polyethylene glycol and copolymers thereof, polyvinyl alcohol and copolymers thereof, polyvinyl pyrrolidone, polyacrylamide and copolymers thereof, polyacrylic acid and copolymers thereof, vinyl methyl ether/maleic anhydride copolymer, vinyl acetate/maleic anhydride copolymer and polystyrenesulfonic acid and copolymers thereof.

The gums should be present in the dampening solution in a total amount ranging from about 0.1% to about 35% by weight; most preferably in an amount ranging from about 0.1% to about 5.0% by weight, these percentages referring to the amount of gum that remains in solution should any precipitate. The pH of the dampening solution preferably ranges from about 3.5 to about 5.5. To adjust the pH to within this range, an acid typically will be added during preparation of the dampening solution. It is suitable to use a mineral acid, an organic acid, an inorganic salt, or the like to adjust the pH to the desired range. Examples of mineral acids include sulfuric acid, nitric acid, phosphoric acid, and metaphosphoric acid. Examples of organic acid include lactic acid, citric acid, oxalic acid, malonic acid, p-toluene sulfonic acid, tartaric acid, malic acid, lebulinic acid, ascorbic acid, gluconic acid, hydroxyacidic acid, acitic acid, sulfanic acid, phytic acid, and the like. Alkali metal salts, alkaline earth metal salts, or ammonium salts of these mineral acids and organic acids also may be used. The foregoing acids and salts may be used alone or in a combination of two or more of them.

The dampening solution preferably includes a wetting agent, such as a surfactant, which should be used in an amount effective to enhance the wettability of the dampening solution. Preferably, the wetting agent is used in an amount ranging from about 0.5% to about 6%; but more preferably, the wetting agent is used in an amount ranging from about 0.35% to about 3.5% by weight. One wetting agent or a combination of wetting agents may be used.

The surfactant may be an anionic, nonionic, cationic, or amphoteric surfactant. Examples of suitable anionic surfactants include salts of aliphatic alcohol sulfates, salts of aliphatic alcohol phosphates, salts of dibasic fatty acid ester sulfonates, salts of fatty acid amide sulfonates, salts of alkylaryl sulfonates and salts of naphalene sulfonate condensed with formaldehyde. Salts of fatty acids, salts of abletic acid, salts of alkanesulfonic acids, salts of hydroxyalkanesulfonic acids, salts of dialkylsulfonosuccunic acids, salts of straight-chain alkylbenzenesulfonic acids, salts of branched alkylbenzenesulfonic acids, salts of alkylnaphthalenesulfonic acids, salts of alkylphenoxypolyoxyethylenepropylsulfonic acids, salts of polyoxyethylene alkylsulfophenyl ethers, sodium salt of N-methyl-N-oleyltaurine, disodium salt of N-alkylsulfosuccinic acid monoamides, salts of petroleum sulfonic acids, sulfated castor oil, sulfated beef tallow, salts of sulfates of fatty acid alkyl esters, salts of alkyl sulfates, salts of sulfates of polyoxyethylene alkyl ethers, salts of fatty acid monoglyceride sulfates, salts of sulfates of polyoxyethylene alkylphenyl ethers, salts of sulfates of polyoxyethylene styrylphenyl ether, salts of alkylphosphoric acids, salts of phosphates of polyoxyethylene alkylphenyl ethers, partial saponification products of styrene/maleic anhydride copolymer, partial sapnification products of olefin/maleic anhydride copolymers and condensates of salts of naphthalenesulfonic acid with formalin. Among them, salts of dialkylsulfonosuccinic acids, salts of alkyl sulfates and salts of alkylnaphthalenesulfonic acids are particularly preferred.

Examples of suitable nonionic surfactant include polyoxyethylene alkyl ethers, polyoxyethylene alkylphenyl ethers, polyoxyethylene polystyrylphenyl ether, polyoxyethylene polyoxypropylene alkyl ether, partial esters of glycerin with fatty acids, partial esters of sorbitan with fatty acids, partial esters of pentaerythritol with fatty acids, esters of propylene glycol with monofatty acids, partial esters of sucrose with fatty acids, partial esters of polyoxyethylene sorbitan with fatty acids, partial esters of polyoxyethylene sorbitol with fatty acids, esters of polyoxyethylene glycol with fatty acids, partial esters of polyglycerine with fatty acids, polyoxyethylenated castor oil, partial esters of polyoxyethylene glycerin with fatty acids, fatty acid diethanolamides, N,N-bis-2-hydroxyalkylamines, polyoxyethylenealkylamines, esters of triethanolamine with fatty acids and triallylamine oxides. Among them, polyoxyethylene alkylphenyl ethers, polyoxylpropylene block polymers, etc., are particularly preferred. Examples of suitable cationic surfactants include alkylamine salts, quaternary ammonium salts, polyoxethylene alkylamine salts, and polyethylene polyamine derivatives.

Further suitable wetting agents include polyols, glycol ethers, and alcohols. The polyol and glycol ether may comprise 2-ethyl-1,3-hexanediol, hexyl carbitol, ethylene glycol, diethylene glycol, triethylene glycol, propylene glycol, dipropylene glycol, tripropylene glycol, hexylene glycol, tetraethylene glycol, 1,5-pentanediol, hexyl cellosolve, glycerin, diglycerin, ethylene glycol monomethyl ether, diethylene glycol monomethyl ether, triethylene glycol monomethyl ether, polyethylene glycol monomethyl ether, propylene glycol monomethyl ether, dipropylene glycol monomethyl ether, ethylene glycolmonopropyl ether, diethylene glycol monopropyl ether, propylene glycol monopropyl ether, dipropylene glycol monopropyl ether, ethylene glycol monoisopropyl ether, diethylene glycol monoisopropyl ether, ethylene glycol monobutyl ether, diethylene glycol monobutyl ether, triethylene glycol monobutyl ether, propylene glycol monobutyl ether, dipropylene glycol monobutyl ether, polypropylene glycol (molecular weight: 200 to 10000), ethylene glycol monoisobutyl ether, diethylene glycol monoisobutyl ether, ethylene glycol monoallyl ether, ethylene glycol monophenyl ether, diethylene glycol monophenyl ether, ethylene oxide adduct of 2-ethyl-1,3-hexanediol, acetylene glycol and ethylene oxide adduct thereof. The alcohol may be, for example, ethyl, n-propyl, isopropyl, n-butyl, isobutyl, n-amyl, or benzyl alcohol.

The dampening solution further may include a preservative, which may be present in any amount effective to provide a preservative effect, i.e., to retard the growth of at least one microorganism such as bacteria, fungi, yeast, and the like. Although the amount of preservative used may depend upon the type of microorganism whose growth is sought to be retarded and the specific chemical employed, the amount of preservative generally should be in the amount of 0.05 to about 1.0% by weight of the dampening solution, more preferably from about 0.1 to about 0.2%. Specific examples of the preservative usable in the present invention include phenol and derivatives thereof, imidazole derivatives, formalin, sodium dehydroacetate, 4-isothiazolin-3-one derivatives, benzotriazole derivatives, amidine guanidine derivatives, quaternary ammonium salts, derivatives of pyridine, guinoline and guanidine, diazine, triazole derivatives, oxazole and oxazine derivatives.

The dampening solution further may include a pH buffer to maintain the pH within the desired range. The pH buffer may be present in any amount effective for this purpose and, preferably, the buffer is present in an amount ranging from about 0.005 to about 2% by weight in general, more preferably, from about 0.001 to about 1% by weight. Examples of pH buffers include alkaline metal oxides, alkaline metal phosphates, alkaline metal carbonates, and silicates.

The dampening solution further may include an anti-foaming agent, which may be present in any amount effective to retard foaming of the composition. Most preferably, the anti-foaming agent is a silicone compound, which may be either an emulsion-type or a “one-pack” type. The anti-foaming agent may be used in any amount ranging from about 0.005% to about 0.4% by weight, more preferably, from about 0.001% to about 0.3% by weight.

Another optional component of the dampening solution is a chelate compound, which may be added to neutralize calcium and other ions found in the source of the solvent water. The chelate compound may be added in any amounts suitable to neutralize ions present in the solvent water source, and most preferably the chelate compound is present in an amount ranging from about 0.005% to about 6% by weight, more preferably, in an amount ranging from about 0.005 to about 1% by weight. Specific examples of the chelate compound include organic phosphoric acids or phosphonoalkanetricarboxylic acids, such as ethylenediaminetetraacetic acid, the potassium salt of ethylenediaminetetraacetic acid, sodium salt of ethylenediaminetetraaccetic acid, diethylenetriaminepentaacetic acid, the potassium salt of diethylenetriaminepentaacetic acid, sodium salt of diethylenetriaminepentaacetic acid, triethylenetetraminehexaacitic acid, sodium salt of triethylenetetraminehexaacetic acid, hydroxyethylenediaminetriaacetic acid, potassium salt of hydroxyethylethylenediaminetriacetic acid, nitrilotriacetic acid, sodium salt of nitrilotriacetic acid, 1-hydroxyethane-1,1-diphosphonic acid, potassium salt of 1-hydroxyethane-1,1-diphosphonic acid, sodium salt of 1-hydroxyethane-1,1-diphosphonic acid, sodium salt of 1-hydroxyethane-1,1-diphosphonic acid, aminotri(methylenephosphonic acid), potassium salt of aminotri(methylenephosphonic acid) and sodium salt of aminotri(methylenephosphonic acid). Further, it is also possible to use organic amine salts of the chelate compounds instead of the potassium salt and sodium salt of the chelate compounds.

The dampening solution further may optionally include a corrosion inhibitor, which may be present in any amount effective to prevent metal oxidation. Examples include benzotriazole, tolyltriazole, benzoamidazole and 2-mercaptobenzoimidazole. Other corrosion inhibitors include zinc nitrate, magnesium nitrate, and sodium nitrate.

The foregoing ingredients are exemplary of the various ingredients and types of ingredients that may be employed, and it is contemplated that other ingredients or other examples of the categories of dampening solution ingredients besides those given above may be included.

In use, the dampening solution may be applied to any suitable lithographic printing plate, such as a photosensitive lithographic printing plate; a deep-edge plate; a multi-layer metallic plate, such as a bi-metal or tri-metal plate; a direct-drawing master, or a lithographic printing plate for electrophotography. Generally, the lithography process will include the steps of providing a lithographic plate, dampening the plate, applying ink to the plate, transferring the inked image to a rubber blanket, and transferring the rubber blanket image to a substrate. The dampening solution may be used in connection with other lithographic processes as may be known or otherwise found to be suitable, such as image erasing and plate protection.

The ability of corn hull hemicellulose to function in a dampening solution is surprising, given the marked variation in composition between corn hull hemicellulose and gum arabic. The following table provides a summary of typical components of corn hull hemicellulose and gum arabic, as well as the makeup of three of the soybean hemicellulose products, as reported in U.S. Pat. No. 5,615,613.

| Monomer | Carbon Atoms | Soybean Hemicellulose (a) | Soybean Hemicellulose (b) | Soybean Hemicellulose (c) | Corn Hull Hemicellulose | Gum Arabic |
|---|---|---|---|---|---|---|
| Galactose | 6 | 47.3% | 46.8% | 43.4% | 8.3% | 44.0% |
| Arabinose | 5 | 19.9% | 19.2% | 23.1% | 33.8% | 24.0% |
| Xylose | 5 | 6.4% | 8.4% | 5.8% | 50.8% | |
| Uronic Acid | 6 | 20.4% | 16.9% | 19.4% | 7.1% | 16.0% |
| Rhamnose | 6 | 1.6% | 2.7% | 2.1% | | 13.0% |
| Average Molecular Wt. | | 178,000 | 207,000 | 114,000 | 270,000–370,000 | 250,000–580,000 |

Moreover, corn hull hemicellulose is more readily obtainable than soybean hemicellulose. Corn seeds are composed of about 5.3% hulls, and the potential yield of hemicellulose from corn hulls is about 55%. Soybean hulls are obtainable from okara, which is the insoluble reside obtained in the process of manufacturing soy milk (see Moizudding et al., *J. Food Sci,* 64: 145-48 (1999)). As is evident from data in the Examples, the yield of corn hull hemicellulose is three to four times the yield of soybean hemicellulose from okara.

The following Examples are provided to illustrate the present invention, but should not be construed as limiting the invention in scope.

EXAMPLE 1

Isolation of Corn Hull Hemicellulose from Corn Hulls Using an Ethanolic Co-Solvent System Five hundred grams (dry basis) corn hulls containing 766 grams water was added to sufficient water to give the total weight of 5000 grams. The corn hulls formed a slurry, which was stirred and "stewed" by maintaining the temperature of the slurry within the range 82° C. to 96° C. for two hours. The hot slurry was then filtered through a number 60 mesh A.S.T.M.E. standard testing sieve. Retained solids were again slurried, stewed, and filtered, and the retained solids from the second treatment were again subjected to a third cycle of slurrying, stewing, and filtering. The retained solids from the third treatment were crumbled, placed on screens, and allowed to air-dry at room temperature to yield 423.5 g (dry basis) treated corn hulls. Starch, protein, and fat in the corn hulls were evaluated, yielding the following results:

| | Original Corn Hulls | Treated Corn Hulls |
|---|---|---|
| % Starch on dry basis | 11.2% | 2.2% |
| % Protein on dry basis | 8.5% | 6.0% |
| % Fat on dry basis | 3.6% | 3.6% |

One hundred grams (dry basis weight) of the corn hulls thus treated were added to a solution containing 1610 mL 190 proof ethanol, 390 mL water, and 20 g 50% NaOH in a reaction flask equipped with a reflux condenser and mechanical stirrer. The stirred reaction mixture was heated to a reflux temperature (78° C.) and then refluxed for three hours. The reaction mixture was cooled to 48° C., then vacuum filtered across a 40° to 60° C. fritted glass funnel. The retained solids were returned to the reaction flask and this procedure completed two more times. The retained solids were then reslurried in a solution containing 1610 mL 190 proof ethanol, 390 mL water at 20° C., and the pH of the slurry was adjusted to 6.5 with 5.8 N hydrochloric acid. The slurry was then vacuum filtered across a 40° to 60° C. fritted glass funnel.

The retained solids were then slurried in 2000 mL water in a reaction flask equipped with a reflux condenser and mechanical stirrer. The stirred mixture was heated to the reflux temperature (98°) and then refluxed for two hours. The mixture was cooled to 50° C., then vacuum filtered across a 40° to 60° C. fritted glass funnel. The filtrate (FILTRATE A) containing the corn hull hemicellulose was retained. The retained solids were reslurried and again refluxed, with the filtrate from this step (FILTRATE B) retained. The retained solids were again reslurried and further refluxed, yielding a filtrate (FILTRATE C).

The combined filtrates A, B, and C containing the corn hemicellulose were assayed to contain 54.5 g solids containing 8.3% ash and equivalent either to 42.4% from dried corn hulls or 50.0% from treated corn hulls. The combined filtrates were then concentrated by using heat and reduced pressure to give a brown-colored syrup at 7.02% solids, having a viscosity of 157 cP at 25° C.

EXAMPLE 2

Dampening Solution

A dampening solution prepared by diluting 118.1 g corn hull hemicellulose prepared in Example 1 with 36 70 ml of tap water containing 4 ml of acetic acid to give a solids content of 0.218%. The dampening solution thus prepared was found to have a pH of 4.1 and a conductivity of 911 mhos/cm at 25° C.

EXAMPLE 3

Preparation of Enzyme Digest of Corn Hull Hemicellulose

One-hundred forty-seven grams (dry basis) corn hull hemicellulose prepared in Example 1 was dissolved into 1953 mL water at 57° C. The pH was adjusted to 4.91 with 5.8N hydrochloric acid. Genecor Enzyme GC-140 (a xylanase enzyme), 12.1 grams was added to form an enzyme system, and the system was maintained with stirring for 24 hours. The enzyme was then inactivated by raising the pH to 7.99 with 50% NaOH and then heating to boiling. The temperature was then lowered to 75° C., and the pH was raised to 11.67 with 50% NaOH. Hydrogen peroxide, 25 mL at 30% potency was added. The pH was adjusted to 11.65 with more 50% NaOH. The temperature was raised to 88° C., and the system was gently agitated for two hours at this temperature. The system was then filtered across a vacuum filter precoated with Silbrico Silkleer Grade 17-S Filter 8. The temperature was lowered to 75° C., and the pH was lowered to 3.95 with 11.6N hydrochloric acid. The final product was a light tan-colored syrup at 6.22% solids, having a viscosity of 47 cP at 25° C.

The molecular weight and color of the original hemicellulose, the product after xylanase digestion, and the product after xylanase digestion and treatment with hydrogen peroxide were evaluated, yielding the following results:

| | Original Hemicellulose | Product After Xylanse Digestion | Product After Xylanase Digestion and Treatment with Hydrogen Peroxide |
|---|---|---|---|
| Molecular Size | 236,900 | 107,500 | 96,100 |

EXAMPLE 4

Dampening Solution

A dampening solution was prepared by diluting 133 g of the product prepared in Example 3 with 3655 ml of tap water containing 4 ml of acetic acid to give a solids content of 0.218%. The dampening solution was measured to have a pH of 3.9 and a conductivity of 1436 mhos/cm at 25° C.

EXAMPLE 5

Isolation of Corn Hull Hemicellulose in an Aqueous System

Dried corn hulls from a corn wet milling process of U.S. Number 2 grade hydrid yellow corn were ground to a fine flour and assayed to contain 6.2% moisture, 7.88% dry basis protein, 11.2% dry basis starch, and 4.65% dry basis fat. The ground corn hulls, 140 pounds, were slurried into 215 gallons water. Calcium hydroxide was added to adjust the pH to 6.9 to 7.0, then 8.4 pounds additional $Ca(OH)_2$ was added and the pH was measured to be 11.95. The resulting slurry was continuously jet-cooked in a pilot cooker at a temperature ranging from 315° F. to 325° F. and a pressure of about 70 psig.

The pH of the cooker product was adjusted to 6.5 to 7.0 with acetic acid, and insolubles in the mixture were removed by centrifugation. The effluent from the centrifuge was polished by filtering across a wound yarn filter rated at 0.5$\mu$. The filtrate was then washed on an ultrafilter which contained a stainless steel membrane having pores of 0.1$\mu$ and thereby having a cutoff of ~200,000 Daltons to obtain a crude retentate containing 3.67% solids and having a conductivity of 750 $\mu$S at 25° C. Twenty-four hundred grams of the crude retentate of hemicellulose solution at 3.67% solids was washed on an ultrafilter at 100,000 Daltons cutoff with reverse osmosis water to give 2445 g of the final retentate of hemicellulose solution at 3.16% solids and a conductivity of 600 $\mu$S at 45° C.

EXAMPLE 6

Dampening Solution

A dampening solution was prepared by diluting 261.1 g corn hull hemicellulose solution prepared in Example 5 with 3527 g of tap water containing 4 cc of acetic acid to give a solids content of 0.218%. The dampening solution thus prepared was found to have a pH of 3.6 and a conductivity of 312 mhos/cm at 25° C.

EXAMPLE 7

Treatment of Hemicellulose with Xylanase

The pH of 4800 g of the crude retentate of hemicellulose solution at 3.67% solids from Example 5 was adjusted to 4.94 with 1:1 hydrochloric acid. The temperature was adjusted to 57° C., and 15.6 g Multifect Xylanase Enzyme was added. The system was stirred and held at temperature for 24 hours. The pH of the system was raised to 7.21 with 50% NaOH, and the system was heated to boiling. One half of the hot digest was filtered on a vacuum Buchner filter across Whatman No. 1 Filter Paper that had been precoated with diatomaceous earth filter aid. The temperature of the filtrate was adjusted to about 45° C., and the filtrate was washed on an ultrafilter at 30,000 Daltons cutoff with reverse osmosis water to give 2198 g of the final retentate of hemicellulose solution at 2.73% solids and a conductivity of 607 $\mu$S at 45° C.

EXAMPLE 8

Dampening Solution

A dampening solution was prepared by diluting 302 g corn hull hemicellulose solution prepared in Example 7 with 3486 g of tap water containing 4 cc of acetic acid to give a solids content of 0.217%. The dampening solution thus prepared was found to have a pH of 3.7 and a conductivity of 310 mhos/cm at 25° C.

EXAMPLE 9

Isolation of Corn Hull Hemicellulose by Alternative Aqueous Process

Dried corn hulls from a corn wet milling process of U.S. Number 2 grade hydrid yellow corn were ground to a fine flour and assayed to contain 6.2% moisture, 7.88% dry basis protein, 11.2% dry basis starch, and 4.65% dry basis fat. The ground corn hulls, 50 pounds, were slurried into 75 gallons water. A 50% sodium hydroxide solution was added to adjust the pH to 6.9 to 7.0, then 9.0 pounds additional 50% sodium hydroxide solution was added and the pH was measured to be 11.95. The resulting slurry was continuously jet-cooked in a pilot cooker at a temperature ranging from 315° F. to 325° F. and a pressure of about 75 psig.

Insolubles in the mixture were removed by centrifugation. The effluent from the centrifuge was polished by filtering across a wound yam filter rated at 0.5$\mu$. The pH of 2600 g of the crude filtrate of hemicellulose solution at 2.62% solids was adjusted to 5.77 with 1:1 hydrochloric acid. The solution of hemicellulose was washed on an ultrafilter at 100,000 Daltons cutoff with reverse osmosis water to give 2077 g of the final retentate of hemicellulose solution at 2.02% solids and a conductivity of 272 $\mu$S at 45° C.

EXAMPLE 10

Dampening Solution

A dampening solution was prepared by diluting 408.4 g corn hull hemicellulose solution prepared in Example 9 with 3379 g of tap water containing 4 cc of acetic acid to give a solids content of 0.218%. The dampening solution thus prepared was found to have a pH of 3.5 and a conductivity of 300 mhos/cm at 25° C.

EXAMPLE 11

Treatment of Hemicellulose with Xylanase

The pH of 5200 g of the crude filtrate of hemicellulose solution at 2.62% solids from Example 9 was adjusted to 4.91 with 1:1 hydrochloric acid. The temperature was adjusted to 57° C., and 11.67 g Multifect Xylanase Enzyme was added. The system was stirred and held at temperature for 24 hours. Next, the pH of the system was adjusted to 7.17 with 50% NaOH, and the system was heated to boiling. One half of the hot digest was filtered on a vacuum Buchner filter across Whatman No. 1 Filter Paper that had been precoated with diatomaceous earth filter aid. The temperature of the filtrate was adjusted to about 45° C., and the filtrate was washed on an ultrafilter at 30,000 Daltons cutoff with reverse osmosis water to give 2178 g of the final retentate of hemicellulose solution at 1.64% solids and a conductivity of 555 $\mu$S at 45° C.

EXAMPLE 12

Dampening Solution

A dampening solution was prepared by diluting 503 g corn hull hemicellulose solution prepared in Example 11 with 3285 g of tap water containing 4 cc of acetic acid to give a solids content of 0.218%. The dampening solution thus prepared was found to have a pH of 3.4 and a conductivity of 304 mhos/cm at 25° C.

COMPARATIVE EXAMPLE 1

Preparation of Okara and Preparation of Soybean Hull Hemicellulose

Soybeans, 900 g "as is" (10.4% moisture) were soaked for 12 hours in water at room temperature, drained, washed and ground twice in increments in 6 L of cold tap water in a Waring blender. The resulting slurry was filtered through a filter cloth to give A) 6360 g of soy milk at 8.33% solids and B) 910 g okara at 20.72% solids. Subsequently, 483 g of "as is" okara was added to 965 g water. The pH was adjusted from 5.46 to 4.50 with 1:1 HCl and the slurry was autoclaved at 120° C. for 90 minutes. Centrifuging the cooked slurry produced 1419 g of supernatant at 2.27% solids, which supernatant was filtered across a fiberglass glass pad on a vacuum Buchner filter funnel. Into 100 g of the filtrate was dissolved 0.5 g NaCl. One hundred grams 200 proof ethanol was added to precipitate the hemicellulose. The mixture was centrifuged and the supernatant was discarded. The sludge was redissolved in 100 g water at room temperature containing 0.5 g NaCl, and precipitated and centrifuged as before. These steps were repeated a third time to yield a sludge. The sludge was carefully dried to at 100° C. overnight to give 0.8779 g soybean hull hemicellulose, equivalent to 12.4% soybean hull hemicellulose from okara and equivalent to 2.61% yield by weight from the beginning soybeans. The yield from okara is substantially poorer than the yields of corn hull hemicellulose reported in Example 1.

COMPARATIVE EXAMPLE 2

A dampening solution was prepared by diluting 32.92 g of a commercial gum arabic solution at 25.18% solids with 3755 ml of tap water containing 4 ml of acetic acid in order to give a solids content of 0.218%. The dampening solution was measured to have a pH of 3.9 and a conductivity of 378 mhos/cm at 25° C.

COMPARATIVE EXAMPLE 3

A dampening solution was prepared by diluting 118.4 g of a commercial dampening solution (Varn Crystal Fountain Solution) at 6.97 solids, with 3670 cc of tap water to give a solids content of 0.218%. The dampening solution was found to have a pH of 4.2 and a conductivity of 1324 mhos/cm at 25° C.

COMPARATIVE EXAMPLE 4

A dampening solution was prepared by diluting 32.92 g of a commercial gum arabic solution at 25.18% solids with 3755 ml of tap water containing 4 ml of acetic acid in order to give a solids content of 0.218%. The dampening solution was measured to have a pH of 3.6 and a conductivity of 355 mhos/cm at 25° C.

COMPARATIVE EXAMPLE 5

A dampening solution was prepared by diluting 118.4 g of a commercial dampening solution (Varn Crystal Fountain Solution) at 6.97% solids with 3670 ml of tap water containing 4 ml of acetic acid in order to give a solids content of 0.218%. The dampening solution was measured to have a pH of 3.8 and a conductivity of 905 mhos/cm at 25° C.

PRINTING EVALUATION

Example 2, Example 4, Comparative Example 2, Comparative Example 3

One thousand impressions were printed from a master plate on Consolidated 80# paper using an ITEK 960 Offset Duplicator Lithographic Offset Printing Press with a magenta ink that was known to be sensitive to printing problems. In separate tests, the printing plate was dampened with the dampening solutions of Examples 2 and 4, as well as those of Comparative Examples 2 and 3. Printed sheets were collected for testing at intervals of 500 prints, 600 prints, 700 prints, 800 prints, and 1000 prints. The test prints were allowed to dry, and then evaluated qualitatively and quantitatively for solid ink density, max dot gain, print contrast resolution index, and print contrast.

Qualitatively speaking, the dampening solution of Example 4 (enzymatic digestion product of corn hull hemicellulose) printed and run as cleanly as the solution of Comparative Example 2 (gum arabic). The solutions of Example 4 and Comparative Examples 2 and 3 were used successfully to rewet non-image areas of thoroughly inked printing plates.

The solution of Example 2 fell short of the performance of that of Comparative Example 2. The non-image area of the printing plate could not be prevented from accepting ink over the course of the printing run.

The response of the dampening solution of Example 4 in the Duke Emulsification Test was nearly identical to that of Comparative Example 2. The ability of an ink to emulsify a dampening solution corresponds to the performance of the dampening solution in commercial use.

| Duke Emulsification Test Protocol |
|---|
| 1. Weigh 50 g ink into the Duke tester sample container. |
| 2. Measure 50 ml dampening solution in a graduated cylinder. |
| 3. Pour the dampening solution into the sample container, load the container in the instrument, and mix for 1 minute. |
| 4. Stop mixer, pour off free liquid into a graduated cylinder, and record the volume. |
| 5. Top off the cylinder to the 50 ml mark with more dampening solution, pour the dampening solution into the sample container, and continue to mix. |
| 6. Repeat the steps 4 and 5 so that volumes of the liquid taken up by the ink are recorded at accumulative time intervals of 1, 2, 3, 4, 5, 6, 7, 8, 9, and 10 minutes. |
| 7. Record the data. |

Results

Percent Dampening Solution Pickup by 100 g of Ink

Ink: Sun Chemical SFOS Nat. II PC Red 26204

| Time (min.)-> | 1 | 2 | 3 | 4 | 5 | 6 | 7 | 8 | 9 | 10 |
|---|---|---|---|---|---|---|---|---|---|---|
| Example 4 | 43% | 60% | 74% | 82% | 93% | 100% | 110% | 119% | 121% | 122% |
| Comparative Example 2 | 35% | 59% | 74% | 86% | 97% | 105% | 113% | 118% | 121% | 123% |
| Comparative Example 3 | 37% | 57% | 68% | 70% | 70% | 70% | 71% | 71% | 72% | 72% |
| Performance Criteria | | | | | | | | | | |
| Ideal Performance | 23% | 31% | 36% | 40% | 41% | 41% | 41% | 41% | 41% | 41% |
| Dampening Solution Too Aggressive Image Blinding | 0.5% | 1.0% | 1.5% | 2.0% | 2.5% | 3.0% | 3.5% | 4.0% | 4.5% | 5.0% |
| Dampening Solution Ineffective Ink Covers Non-Image Area | 22% | 49% | 75% | 100% | 125% | 150% | 175% | 200% | 225% | 250% |

The tests for the dampening solutions of Example 2 and Example 4 and of Comparative Example 2 and Comparative Example 3 demonstrates that all of the dampening solutions allowed achieving and holding solid ink density at the criterion of 1.0+/−0.07 throughout the runs. Dot gain was comparable and near the ideal of 22% for all the runs. Print contrast was acceptable for all of the runs. The print contrast ranking (best to worst) was as follows:

Comparative Example 3 (best)

Comparative Example 2

Example 4

Example 2

Solid ink density (SID) may be defined as the degree of darkness (light absorption or opacity) of a given printed solid target, as measured with a reflection densitomiter. Density may be defined as $\log_{10}(I_0/I)$ wherein $I_O$ is the incoming light intensity, and I is the reflected light intensity. The desired SID range for matt offset printing is 1.0 to 1.4. The following results were obtained.

| Solid Ink Density | | | | | | |
|---|---|---|---|---|---|---|
| Dampening Solution | 500 imp. | 600 imp. | 700 imp. | 800 imp. | 1,000 imp. | Average |
| Example 2 | 1.09 | 1.08 | 1.08 | 1.09 | 1.08 | 1.08 |
| Example 4 | 1.06 | 1.04 | 1.06 | 1.05 | 1.07 | 1.06 |
| Comparative Example 2 | 1.09 | 1.10 | 1.09 | 1.07 | 1.08 | 1.09 |
| Comparative Example 3 | 1.07 | 1.06 | 1.06 | 1.10 | 1.06 | 1.07 |

Dot gain (DG) may be defined as the mechanical increase in half-tone dot size that occurs as the image is transferred from plate to blanket to paper in lithography. Dot gain is also measured with a reflection densitometer. The following results were obtained.

| Max Dot Gain | | | | | | |
|---|---|---|---|---|---|---|
| Dampening Solution | 500 imp. | 600 imp | 700 imp | 800 imp | 1,000 imp. | Average |
| Example 2 | 23.4 | 23.4 | 23.4 | 23.3 | 24.1 | 23.5 |
| Example 4 | 23.8 | 24.7 | 23.5 | 23.5 | 23.7 | 23.9 |
| Comparative Example 2 | 23.5 | 23.4 | 23.8 | 24.0 | 24.1 | 23.8 |
| Comparative Example 3 | 23.7 | 25.4 | 24.6 | 24.5 | 23.8 | 24.4 |

Contrast resolution index (CRI) is a measurement number of a printed image, which is defined as SID/DG×100. The following results were obtained.

| Contrast Resolution Index (CRI) | | | | | | |
|---|---|---|---|---|---|---|
| Dampening Solution | 500 imp. | 600 imp. | 700 imp. | 800 imp. | 1,000 imp. | Average |
| Example 2 | 4.68 | 4.60 | 4.64 | 4.69 | 4.48 | 4.62 |
| Example 4 | 4.46 | 4.19 | 4.49 | 4.47 | 4.51 | 4.42 |
| Comparative Example 2 | 4.66 | 4.70 | 4.60 | 4.46 | 4.48 | 4.58 |
| Comparative Example 3 | 4.50 | 4.17 | 4.33 | 4.50 | 4.46 | 4.39 |

Print contrast (PC) is the ratio of the densitometric reading of the 75% screened area to that of the solid print area. The following results were obtained.

| Print Contrast | | | | | | |
|---|---|---|---|---|---|---|
| Dampening solution | 500 imp. | 600 imp. | 700 imp. | 800 imp. | 1,000 imp. | Average |
| Example 2 | 13.6 | 30.3 | 20.2 | 20.1 | 33.8 | 23.6 |
| Example 4 | 27.5 | 31.1 | 28.7 | 27.6 | 28.2 | 28.6 |
| Comparative Example 2 | 32.0 | 29.6 | 28.8 | 32.6 | 24.1 | 29.4 |
| Comparative Example 3 | 32.9 | 30.3 | 31.7 | 32.3 | 33.6 | 32.2 |

PRINTING EVALUATION

Example 6, Example 8, Example 10, Example 12, Comparative Example 4 and Comparative Example 5

Each dampening solution was used to print one thousand impressions from a master plate using an Itek 960 offset Duplicator Lithographic Printing Press with a Georgia Pacific Spectrum Opaque 50# paper and with a magenta ink that was known to be sensitive to printing problems. In each set, 800 impressions were run, and at intervals of 250 prints and 500 prints, printed sheets were collected, allowed to dry, and then evaluated for density, dot gain, print contrast, and image resolution. The runnability of each dampening solution was assessed over the course of the 800 impressions in order to achieve a relative ranking. Good runnability is achieved with the following factors are met:

a) adequate and accurate inking of the image areas b) no ink in the non-image areas c) satisfactory rewetting of a totally inked-over plate d) minimal ink carryover into the dampening solution e) minimal over wetting of the ink roller train The runnability ranking, as determined via inspection, was as follows Runnability Ranking During First 800 Impressions Dampening Solution Run

| | |
|---|---|
| 1 | EXAMPLE 8 |
| 2 | COMPARATIVE EXAMPLE 5 |
| 3 | EXAMPLE 12 |
| 3 | COMPARATIVE EXAMPLE 4 |
| 4 | EXAMPLE 10 |
| 4 | EXAMPLE 6 |

Once 800 impressions had been made, the amount of dampening solution on the printing press was reduced (the machine setting was reduced from a setting of 7 to a setting of 5). Reducing the dampening solution setting increases the likelihood of failure because the tendency of the non-image areas of the to take on ink is increased when less dampening solution is applied to the printing place. Once 200 more impressions had been taken, printed sheets were again collected, allowed to dry, and then visually evaluated and ranked for appearance. The ranking of the impressions was as follows:

Print Visual Appearance Ranking after Reduced Dampening Solution Run

| | |
|---|---|
| 1 | EXAMPLE 8 |
| 2 | COMPARATIVE EXAMPLE 5 |
| 3 | EXAMPLE 12 |
| 4 | COMPARATIVE EXAMPLE 4 |
| 5 | EXAMPLE 10 |
| 6 | EXAMPLE 6 |

Qualitatively speaking, the dampening solution of Example 8 printed and ran as cleanly as the dampening solution of Comparative Example 5. The dampening solution of Example 8 exhibited low emulsion in the roller train of the printing press. The dampening solution of Example 8, the dampening solution of Comparative Example 4, and the dampening solution of Comparative Example 5 were used successfully to rewet the non-image areas of thoroughly inked printing plates. The observed print quality (less ink in non-image areas) of the final prints at the end of the reduced dampening solution setting run was superior for that of the dampening solution of Example 8 compared to the dampening solution of Comparative Example 5 and the dampening solution of Comparative Example 5.

Similarly, the dampening solution of Example 12 printed and ran as cleanly as or better than the dampening solution of Comparative Example 3. The dampening solution of Example 12 exhibited low emulsion in the roller train of the printing press. The dampening solution of Example 12, the dampening solution of Comparative Example 4, and the dampening solution of Comparative Example 5 were used successfully to rewet the non-image areas of thoroughly inked printing plates. The observed print quality (less ink in non-image areas) of the final prints at the end of the reduced dampening solution setting run was superior for that of the dampening solution of Example 12 compared to the dampening solution of Comparative Example 4, but not as good as that of Comparative Example 5.

Moreover, the dampening solution of Example 10 printed and ran well compared to the dampening solution of Comparative Example 4. The dampening solution of Example 10 exhibited low emulsion in the roller train of the printing press. Ink stripped off the water fountain pan roller, and surface water was observed in the ink roller train. The dampening solution of Example 10, the dampening solution of Comparative Example 4, and the dampening solution of Comparative Example 5 were used successfully to rewet the non-image areas of thoroughly inked printing plates. The observed print quality (less ink in non-image areas) of the final prints at the end of the reduced dampening solution setting run was inferior to that of the run with the dampening solution of Comparative Example 4.

The dampening solution of Example 6 exhibited ink and water balance problems, and it did not provide a consistent ink density. The printing press ran very wet. Ink stripped off the water fountain pan roller, and surface water was observed in the ink roller train. The observed print quality (less ink in non-image areas) of the final prints at the end of the reduced dampening solution setting run was inferior to that of Example 10.

The responses of the dampening solutions in Example 6, Example 8, Example 10, and Example 12 in the Duke Emulsification Test (defined previously) were almost identical to that of the dampening solution of Comparative Example 5 as shown I the tabulated results below:

Duke Emulsification Test

Percent Dampening Solution Pickup by 100 g of Ink

| Time (min.)=> | 1 | 2 | 3 | 4 | 5 | 6 | 7 | 8 | 9 | 10 |
|---|---|---|---|---|---|---|---|---|---|---|
| Example 6 | 34.8 | 45.8 | 45.8 | 46.2 | 46.0 | | | 48.4 | | 49.0 |
| Example 8 | 34.2 | 43.6 | 44.8 | 44.2 | 45.0 | | | 47.4 | | 46.2 |
| Example 10 | 35.4 | 42.8 | 43.8 | 44.6 | 45.6 | | | 46.6 | | 46.6 |
| Example 12 | 34.2 | 42.4 | 44.0 | 45.0 | 46.2 | | | 46.6 | | 47.0 |
| Comparative Example 5 | 38.4 | 47.2 | 47.4 | 47.8 | 47.8 | | | 50.2 | | 49.8 |
| Comparative Example 4 | 34.8 | 42.6 | 44.2 | 44.8 | 45.0 | | | 47.6 | | 47.6 |
| Performance Criteria | | | | | | | | | | |
| Ideal Performance | 23% | 31% | 36% | 40% | 41% | 41% | 41% | 41% | 41% | 41% |
| Dampening Solution Too Aggressive Image Blinding | 0.5% | 1.0% | 1.5% | 2.0% | 2.5% | 3.0% | 3.5% | 4.0% | 4.5% | 5.0% |

-continued

| Time (min.)→ | 1 | 2 | 3 | 4 | 5 | 6 | 7 | 8 | 9 | 10 |
|---|---|---|---|---|---|---|---|---|---|---|
| Dampening Solution Ineffective Ink Covers Non-Image Area | 22% | 49% | 75% | 100% | 125% | 150% | 175% | 200% | 225% | 250% |

The print tests for the dampening solutions demonstrate that all of the dampening solutions achieved and held solid ink density at the selected criterion of 0.80+/−0.05. Contrast Resolution Index measurements were judged acceptable for Example 6, Example 8, Example 10, and Example 12 compared to the measurements for Comparative Example 4, and Comparative Example 5. Print contrast for Example 6, Example 8, Example 10, and Example 12 were also judged to be acceptable compared to the measurements for Comparative Example 4 and Comparative Example 5. The print test results were as follows:

| Dampening Solution | 250 imp. | 500 imp. | Average |
|---|---|---|---|
| | Sold Ink Density | | |
| Example 6 | 0.85 | 0.80 | 0.82 |
| Example 8 | 0.81 | 0.86 | 0.84 |
| Example 10 | 0.78 | 0.80 | 0.79 |
| Example 12 | 0.82 | 0.77 | 0.80 |
| Comparative Example 4 | 0.81 | 0.82 | 0.82 |
| Comparative Example 5 | 0.77 | 0.77 | 0.77 |
| | Max Dot Gain | | |
| Example 6 | 25.4 | 26.6 | 26.0 |
| Example 8 | 24.0 | 26.1 | 25.1 |
| Example 10 | 24.7 | 24.8 | 24.8 |
| Example 12 | 26.6 | 23.8 | 25.2 |
| Comparative Example 4 | 22.7 | 24.6 | 23.7 |
| Comparative Example 5 | 20.5 | 24.4 | 22.5 |
| | Contrast Resolution Index (CRI) | | |
| Example 6 | 3.33 | 3.01 | 3.17 |
| Example 8 | 3.37 | 3.31 | 3.34 |
| Example 10 | 3.14 | 3.23 | 3.19 |
| Example 12 | 3.10 | 3.24 | 3.17 |
| Comparative Example 4 | 3.58 | 3.33 | 3.46 |
| Comparative Example 5 | 3.77 | 3.14 | 3.45 |
| | Print Contrast | | |
| Example 6 | 24.8 | 16.6 | 20.7 |
| Example 8 | 23.4 | 21.9 | 22.6 |
| Example 10 | 27.4 | 18.9 | 23.1 |
| Example 12 | 19.7 | 21.8 | 20.7 |
| Comparative Example 4 | 22.2 | 17.3 | 19.7 |
| Comparative Example 5 | 19.6 | 5.1 | 12.3 |

It is thus seen that the aforestated general object has been satisfied. The invention provides a dampening solution and method for dampening a lithographic plate.

While particular embodiments of the invention have been shown, it will be understood that the invention is not limited thereto since modifications may be made by those skilled in the art, particularly in light of the foregoing teachings. It is, therefore, contemplated by the appended claims to cover any such modifications as incorporate those features, which constitute the essential features of these improvements within the true spirit and scope of the invention. All references cited are hereby incorporated by reference in their entireties.

What is claimed is:

1. A method for dampening a lithographic plate that includes an ink-receptive image area and an ink-repellent non-image area, the method comprising the step of applying a dampening solution to at least said non-image area, said dampening solution comprising an aqueous solution of a corn-hull-derived hemicellulose, said hemicellulose being present in said solution in an amount effective to provide sufficient film formability to enhance the ink repellency of the non-image area of said lithographic plate.

2. A method according to claim 1, wherein said hemicellulose is present in said dampening solution in an amount ranging from about 0.1% to about 35% by weight.

3. A method according to claim 2, wherein said hemicellulose is present in said dampening solution in an amount ranging from about 0.1 to about 5% by weight.

4. A method according to claim 1, wherein said dampening solution contains a wetting agent in an amount effective to enhance the wettability of said dampening solution.

5. A method according to claim 1, wherein said dampening solution includes a preservative in an amount effective to impart a preserving effect on said solution.

6. A method according to claim 1, wherein said dampening solution includes an anti-foaming agent in an amount effective to retard foam formation.

7. A method for dampening a lithographic plate that includes an ink-receptive image-area and an ink-repellent non-image area, the method comprising the steps of applying a dampening solution to at least said non-image area, said dampening solution comprising an aqueous solution of the enzyme digestion product of a hemicellulose, said digestion product being present in said solution in an amount effective to provide sufficient film formability to enhance the ink repellency of the non-image area of said lithographic plate.

8. A method according to claim 7, wherein said hemicellulose is a corn-hull-derived hemicellulose.

9. A method according to claim 7, wherein said digestion product has been treated with a bleach after enzyme digestion.

10. A method according to claim 9, wherein said bleach is hydrogen peroxide.

11. A method according to claim 7, wherein said digestion product is present in said dampening solution in an amount ranging from about 0.1 to about 35% by weight.

12. A method according to claim 11, wherein said digestion product is present in said dampening solution in an amount ranging from about 0.1 to about 5% by weight.

13. A method according to claim 7, wherein said dampening solution contains a wetting agent in an amount effective to enhance the wettability of said dampening solution.

14. A method according to claim 7, wherein said dampening solution includes a preservative in an amount effective to impart a preserving effect on said solution.

15. A method according to claim 7, wherein said dampening solution includes an anti-foaming agent in an amount effective to retard foam formation.

16. A dampening solution comprising water; the enzyme digestion product of a hemicellulose, said digestion product being present in an amount effective to provide sufficient film-formability to enhance the ink repellency of said solution; and a wetting agent, said wetting agent being present in an amount effective to enhance the wettability of said dampening solution, wherein said hemicellulose is corn-hull-derived hemicellulose.

17. A dampening solution according to claim 16, wherein said digestion product has been treated with a bleach after enzyme digestion.

18. A dampening solution according to claim 16, wherein said bleach is hydrogen peroxide.

19. A dampening solution according to claim 16, wherein said digestion product is present in an amount ranging from about 0.1% to about 35% by weight.

20. A dampening solution according to claim 19, wherein said digestion product is present in an amount ranging from about 0.1% to about 5% by weight.

21. A dampening solution according to claim 16, further including a preservative in an amount effective to impart a preserving effect on said solution.

22. A dampening solution according to claim 16, further including an anti-foaming agent in an amount effective to retard foam formation.

23. A dampening solution comprising water; corn hull derived hemicellulose, said hemicellulose being present in an amount effective to provide sufficient film-formability to enhance the ink repellency of said solution; and a wetting agent, said wetting agent being present in an amount effective to enhance the wettability of said dampening solution.

24. A dampening solution according to claim 23, wherein said corn hull derived hemicellulose has been treated with a bleach.

25. A dampening solution according to claim 23, wherein said bleach is hydrogen peroxide.

26. A dampening solution according to claim 23, wherein said corn hull derived hemicellulose is present in an amount ranging from about 0.1% to about 35% by weight.

27. A dampening solution according to claim 26, wherein said corn hull derived hemicellulose is present in an amount ranging from about 0.1% to about 5% by weight.

28. A dampening solution according to claim 23, further including a preservative in an amount effective to impart a preserving effect on said solution.

29. A dampening solution according to claim 23, further including an anti-foaming agent in an amount effective to retard foam formation.

* * * * *